(12) United States Patent
Graba et al.

(10) Patent No.: US 6,741,532 B1
(45) Date of Patent: May 25, 2004

(54) SERVO CIRCUITRY FOR COUNTING TRACKS ON AN OPTICAL STORAGE MEDIUM

(75) Inventors: James Mark Graba, Longmont, CO (US); German S. O. Feyh, Boulder, CO (US); Hao Huang, Austin, TX (US); Louis Supino, Boulder, CO (US)

(73) Assignee: Cirrus Logic, Inc., Austin, TX (US)

( * ) Notice: Subject to any disclaimer, the term of this patent is extended or adjusted under 35 U.S.C. 154(b) by 529 days.

(21) Appl. No.: 09/698,421

(22) Filed: Oct. 27, 2000

(51) Int. Cl.[7] .................................................. G11B 7/00
(52) U.S. Cl. ............................... 369/44.28; 369/44.34; 369/44.41
(58) Field of Search ........................... 369/44.27, 44.28, 369/44.29, 44.34, 44.35, 44.25, 44.41, 44.42, 53.1, 59.1, 124.01

(56) References Cited

U.S. PATENT DOCUMENTS

| | | | |
|---|---|---|---|
| 5,914,922 A | * | 6/1999 | Supino et al. ........... 369/44.28 |
| 5,956,304 A | | 9/1999 | Supino et al. |

FOREIGN PATENT DOCUMENTS

| | | |
|---|---|---|
| EP | 0 401 973 A | 12/1990 |
| EP | 0 429 421 A | 5/1991 |
| EP | 0 822 542 A | 2/1998 |

OTHER PUBLICATIONS

Stikvoort, Eduard F., "An All–Digital Bit Detector for Compact Disc Players," IEEE Journal on Selected Areas In Communications, vol. 10 (No. 1), p. 191, (Jan. 1992).

* cited by examiner

*Primary Examiner*—Muhammad Edun
(74) *Attorney, Agent, or Firm*—Duft Setter Ollila & Bornsen LLC

(57) ABSTRACT

Servo circuitry for counting tracks on an optical storage medium is disclosed. The servo circuitry is comprised of a differential phase detector and a digital phase-locked loop. The differential phase detector receives four signals from a quad-photodetector and correlates the four signals into a first correlation signal and a second correlation signal. The digital phase-locked loop receives an adjustable amplification value along with the positive correlation signal and the negative correlation signal. The digital phase-locked loop generates a track count signal based on the adjustable amplification value, the positive correlation signal, and the negative correlation signal. The track count signal represents track crossings on the optical storage medium. The digital phase-locked loop advantageously has an adjustable bandwidth based on the amplification value. The servo circuitry count tracks on both CDs and DVDs.

51 Claims, 8 Drawing Sheets

FIG. 6

CORRELATION DATA STRUCTURE

| W | X | Y | Z | R(p, n)(0,1) |
|---|---|---|---|---|
| 0 | 0 | 0 | 0 | 1 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | -1 |
| 0 | 1 | 1 | 0 | -1 |
| 0 | 1 | 1 | 1 | 0 |
| 1 | 0 | 0 | 0 | 0 |
| 1 | 0 | 0 | 1 | -1 |
| 1 | 0 | 1 | 0 | -1 |
| 1 | 0 | 1 | 1 | 0 |
| 1 | 1 | 0 | 0 | 1 |
| 1 | 1 | 0 | 1 | 0 |
| 1 | 1 | 1 | 0 | 0 |
| 1 | 1 | 1 | 1 | 1 |

600

SERVO CIRCUITRY FOR COUNTING TRACKS ON AN OPTICAL STORAGE MEDIUM

BACKGROUND OF THE INVENTION

1. Field of the Invention

The invention relates to the field of optical storage systems, and in particular, to servo circuitry in an optical storage system for counting tracks on an optical storage medium.

2. Statement of the Problem

An optical disk stores data on circular tracks on its surface. An optical disk device reads the optical disk by centering an optical head over a track, reflecting a light beam off of the surface of the disk, and detecting the reflected light beam with a four-quadrant photo-detector. The photo-detector generates a signal for each quadrant and transfers the four signals to servo circuitry. The servo circuitry uses the quadrant signals to keep the optical head centered over the track when following the track during a read function. The optical disk device is also able to seek out a particular track on the optical disk to read from that track. The optical disk device seeks by counting the number of tracks that the optical head crosses over during the seek function. The servo circuitry again uses the quadrant signals to count track crossings and locate the desired track. A problem with the current servo circuitry is the servo circuitry does not have a bandwidth that is easily adjustable. Another problem is that the servo circuitry is error prone when the optical disk contains a defect. Another problem is that the servo circuitry does not count tracks on both Compact Disks (CDs) and Digital Video Disks (DVDs) using the same track counter.

FIG. 1 shows an optical disk system 100 in the prior art. Optical disk system 100 is comprised of an optical disk device 102 coupled to a servo system 104. Optical disk device 102 includes an optical head that contains an optical transducer and a four-quadrant photo-detector 110. Servo system 104 is comprised of a servo detector 106 connected to a servo controller 108. Servo detector 106 is comprised of diagonal signal generators 122–123, a positive correlator 126, a negative correlator 128, an Adaptive Dual Arm Correlator (ADAC) 130, and a track counter 132. Optical disk device 102 is connected to diagonal signal generators 122–123 in servo detector 106. Diagonal signal generators 122–123 are connected to positive correlator 126 and negative correlator 128. Positive correlator 126 and negative correlator 128 are connected to ADAC 130. ADAC 130 is connected to track counter 132 and servo controller 108. Track counter 132 is connected to servo controller 108. The servo controller 108 is connected to optical disk device 102.

Optical disk device 102 stores data on an optical disk in the form of a series of pits arranged into tracks. The data is encoded on pit edges. The pit lengths and the distance between pits are integer channel bit periods. Run-length limited encoding determines the distance between edges. To read from the optical disk, the optical disk device 102 positions the optical head over the optical disk. The optical transducer projects a light beam onto a surface of the optical disk. The light beam reflects off of the pits and the surface of the optical disk, and onto photodetector 110. Photodetector 110 has four quadrants and each quadrant generates a signal. For instance, quadrant B generates a signal B representing the reflection of the light beam captured by quadrant B. If the optical head is centered over a track on the optical disk and the track runs parallel to a line between quadrants A and B, then quadrants A–D will see substantially similar light power and will generate similar amplitude signals. If the optical head is off-center, quadrants A and D see substantially similar light power and quadrants B and C see substantially similar light power. In the off-track case the sum of the power at quadrants A and D is different from the sum of the power at quadrants B and C. Photo-detector 110 transfers respective signals A–D to servo system 104.

Servo system 104 processes embedded tracking error data to center the optical head over the track with logic appreciated by one skilled in the art as follows. Servo system 104 receives signals A–D. Signals A–D include encoded user data and the embedded tracking error data. A read channel circuit (not shown) processes signals A–D to detect the encoded user data. Servo system 104 processes signals A–D to detect the embedded tracking error data. The embedded tracking error data is not physically written onto the optical disk, but is inherent to optical systems and results from the reflection of the light beam changing as the optical head moves off-track. Servo system 104 uses the embedded tracking error data to center the optical head during track following functions and to find a particular track during seek functions.

Within servo system 104, servo detector 106 generates a Position Error Signal (PES) and a track count signal by logic appreciated by one skilled in the art as follows. The PES represents how far off track the optical head is during the track following functions. The track count signal represents track crossings during the seek functions. Diagonal signal generator 122 receives signal A and signal C from photo-detector 110. Diagonal signal generator 122 adds signal A and signal C to generate a diagonal signal S1. Diagonal signal generator 122 transfers S1 to positive correlator 126 and negative correlator 128. Diagonal signal generator 123 receives signal B and signal D from photo-detector 110. Diagonal signal generator 123 adds signal B and signal D to generate a diagonal signal S2. Diagonal signal generator 123 transfers S2 to positive correlator 126 and negative correlator 128.

Positive correlator 126 receives S1 from diagonal signal generator 122 and S2 from diagonal signal generator 123. Positive correlator 126 correlates S1 and S2 by summing S1 and S2 over a length L bits, where L represents a correlation length. Positive correlator 126 generates a positive correlation CorrP and transfers CorrP to ADAC 130. Negative correlator 128 also receives S1 from diagonal signal generator 122 and S2 from diagonal signal generator 123. Negative correlator 128 correlates S1 and S2 by summing S1 and S2 over the length L bits. Negative correlator 126 generates a negative correlation CorrN and transfers CorrN to ADAC 130.

ADAC 130 receives CorrP from positive correlator 126 and CorrN from negative correlator 128. ADAC 130 generates the PES by taking the difference between CorrP and CorrN. ADAC 130 transfers the PES to servo controller 108. ADAC 130 also receives S1 and S2 from diagonal signal generators 122–123. ADAC 130 generates a Phase Offset Signal (POS) by determining the offset between S1 and S2. ADAC 130 transfers the POS to track counter 132. The POS is a sinusoidal signal that is cyclic with track crossings. Track counter 132 receives and filters the POS with a programmable band pass filter. Track counter 132 slices the filtered POS and counts the number of edges to generate the track count signal. Track counter 132 transfers the track count signal to servo controller 108.

Servo controller 108 uses the PES to center the optical head during the track following functions and the track count signal to position the optical head over the particular track during the seek functions.

A problem with servo detector 106 is ADAC 130 is an adaptive algorithm that relies on a measured phase difference between the diagonal signals S1 and S2 to be linear between +/− pi. In practice the phase difference is more apt to be sinusoidal. ADAC 130 has problems track counting and finding a transducer gain for servo system 104 during calibration. Another problem is noise and defects easily corrupt track counter 132. Track counter 132 uses a programmable filter to ameliorate the effects of noise. Unfortunately, the filter limits the bandwidth of track counter 132 and requires the servo detector 106 adjust a bandwidth of the POS according to the seek velocity.

FIG. 2 shows diagonal signal generator 122 in the prior art. Diagonal signal generator 122 is comprised of band-pass filters 202–203, comparators 212–213, samplers 222–223, delays 232–233, and OR circuit 242. Band-pass filter 202 connects to comparator 212. Comparator 212 connects to sampler 222. Sampler 222 connects to delay 232. Delay 232 connects to OR circuit 242. Band-pass filter 203 connects to comparator 213. Comparator 213 connects to sampler 223. Sampler 223 connects to delay 233. Delay 233 connects to OR circuit 242.

In operation, band-pass filter 202 receives analog signal A from photo-detector 110. Band-pass filter 202 filters signal A to attenuate noise and generates a first filtered signal. Band-pass filter 202 transfers the first filtered signal to comparator 212. Comparator 212 converts the first filtered signal into a first polarity square wave using hysteresis and transfers the first polarity square wave to sampler 222. Sampler 222 samples the first polarity square wave to generate a first binary square wave. Sampler 222 transfers the first binary square wave to delay 232. Delay 232 delays the first binary square wave in order to calibrate servo system 104 according to the characteristics of optical disk device 102. Delay 232 transfers the delayed first binary square wave to OR circuit 242.

Band-pass filter 203 receives analog signal C from the photodetector 110. Band-pass filter 203 filters signal C to attenuate noise and generates a second filtered signal. Band-pass filter 203 transfers the second filtered signal to comparator 213. Comparator 213 converts the second filtered signal into a second polarity square wave using hysteresis and transfers the second polarity square wave to sampler 223. Sampler 223 samples the second polarity square wave to generate a second binary square wave. Sampler 223 transfers the second binary square wave to delay 233. Delay 233 delays the second binary square wave in order to calibrate servo system 104 according to the characteristics of optical disk device 102. Delay 233 transfers the delayed second binary square wave to OR circuit 242.

OR circuit 242 receives the first and second binary square waves from delay 232 and delay 233 respectively. OR circuit 242 ors the first binary square wave and the second binary square wave to generate diagonal signal S1. OR circuit 242 transfers S1 to positive correlator 126 and negative correlator 128. Diagonal signal generator 123 operates the same way on signal B and signal D to generate diagonal signal S2. Diagonal signal generator 123 transfers S2 to positive correlator 126 and negative correlator 128.

A problem with diagonal signal generator 122 is its susceptibility to lens shift. Lens shift occurs when the amplitude of two of the quadrant signals A–D decrease while the other two remain the same. The decrease in the amplitude of two signals is commonly caused by a tilt in a lens in the optical head. The amplitude variation adversely affects the phase of diagonal signals S1 and S2 when diagonal signal generators 122–123 add signals A–D to generate S1 and S2. Lens shift changes the PES's baseline as a function of radial lens tilt. Lens shift can cause servo system 106 to improperly position the optical head when track following. Lens shift can also cause track counter 132 problems in slicing the POS to generate the track count signal. Delays 232–233 reduce effects of lens shift, but after calibration using a complicated calibration algorithm.

FIG. 3 shows positive correlator 126 in the prior art. Positive correlator 126 is comprised of delays 302–303, ΣXNORs 306–307, and an adder 310. Delay 302 connects to ΣXNOR 306. ΣXNOR 306 connects to adder 310. Delay 303 connects to ΣXNOR 307. ΣXNOR 307 connects to adder 310.

In operation, delay 302 receives S2 from diagonal signal generator 123 and a predetermined correlation offset Δ. The correlation offset Δ is adaptively adjusted to maximize the positive correlation and the negative correlation. Delay 302 delays S2 by Δ+ and transfers delayed S2 to ΣXNOR 306. ΣXNOR 306 receives S1 from diagonal signal generator 122 and delayed S2 from delay 302. ΣXNOR 306 sums the XNOR of S1 and delayed S2 over a length L bits, where L represents a correlation length. ΣXNOR 306 generates a correlation signal +CorrP and transfers +CorrP to adder 310.

Delay 303 receives S2 from diagonal signal generator 123 and Δ. Delay 303 delays S2 by Δ− and transfers delayed S2 to ΣXNOR 307. Δ− is slightly smaller than Δ+. ΣXNOR 307 receives S1 from diagonal signal generator 122 and delayed S2 from delay 303. ΣXNOR 307 sums the XNOR of S1 and delayed S2 over the length L bits. ΣXNOR 307 generates a correlation signal −CorrP and transfers −CorrP to adder 310.

Adder 310 receives +CorrP and −CorrP from the ΣXNOR 306 and ΣXNOR 307 respectively. Adder 310 adds +CorrP and −CorrP to generate the correlation signal CorrP. Adder 310 transfers CorrP, +CorrP, and −CorrP to ADAC 130. Negative correlator 128 operates substantially in the same manner as positive correlator 126 to generate correlation signals CorrN, +CorrN, and −CorrN. A difference is negative correlator 128 delays S1 by Δ instead of delaying S2. The negative correlator 128 transfers CorrN, +CorrN, and −CorrN to ADAC 130. A problem with positive correlator 126 and negative correlator 128 is both are overly complicated.

SUMMARY OF THE INVENTION

The solution involves servo circuitry that counts tracks on an optical storage medium using a digital phase-locked loop. The digital phase-locked loop advantageously has an adjustable bandwidth that is adjusted by altering an amplification value as opposed to prior art track counters. Adjusting the bandwidth of the prior art track counters entails changing low pass filters prior to the track counters. The digital phase-locked loop also advantageously generates a track count signal using estimated values making it less susceptible to errors due to defects and noise in reading the optical storage medium. Further, the servo circuitry advantageously operates with both Digital Video Disks (DVDs) and Compact Disks (CDs) and does not need separate circuitry for each. Track counting using the digital phase-locked loop allows for deletion of a sled encoder.

The servo circuitry is comprised of a differential phase detector and the digital phase-locked loop. The differential phase detector receives signals from a detector and correlates the signals to generate a positive correlation signal and a negative correlation signal. The digital phase-locked loop receives an adjustable amplification signal, the positive correlation signal, and the negative correlation signal. The digital phase-locked loop generates the track count signal based on the adjustable amplification signal, the positive correlation signal, and the negative correlation signal. The track count signal represents track crossings on the optical storage medium. The bandwidth of digital phase-locked loop is adjusted by changing the amplification value.

In some embodiments, the digital phase-locked loop receives an offset signal. The digital phase-locked loop estimates the positive correlation signal and the negative correlation signal based on the offset signal. If the positive correlation signal and/or the negative correlation signal is adversely affected due to a defect in reading the optical storage medium, then the digital phase-locked loop still generates a track count signal that is substantially accurate because of the signal are estimated.

In some embodiments, the servo circuitry operates with both DVDs and CDs. The servo circuitry further comprises a first multiplexer and a second multiplexer coupled to the differential phase detector and the digital phase-locked loop. The first multiplexer and the second multiplexer transfer the positive correlation signal and the negative correlation signal, respectively, to the digital phase-locked loop if the optical storage medium is a DVD. The first multiplexer and the second multiplexer transfer a RF envelope signal and a CD seek position error signal, respectively, to the digital phase-locked loop if the optical storage medium is a CD

DESCRIPTIONS OF THE DRAWINGS

FIG. 6 depicts a correlation data structure in an example of the invention.

DETAILED DESCRIPTION OF THE INVENTION

Figure 1:
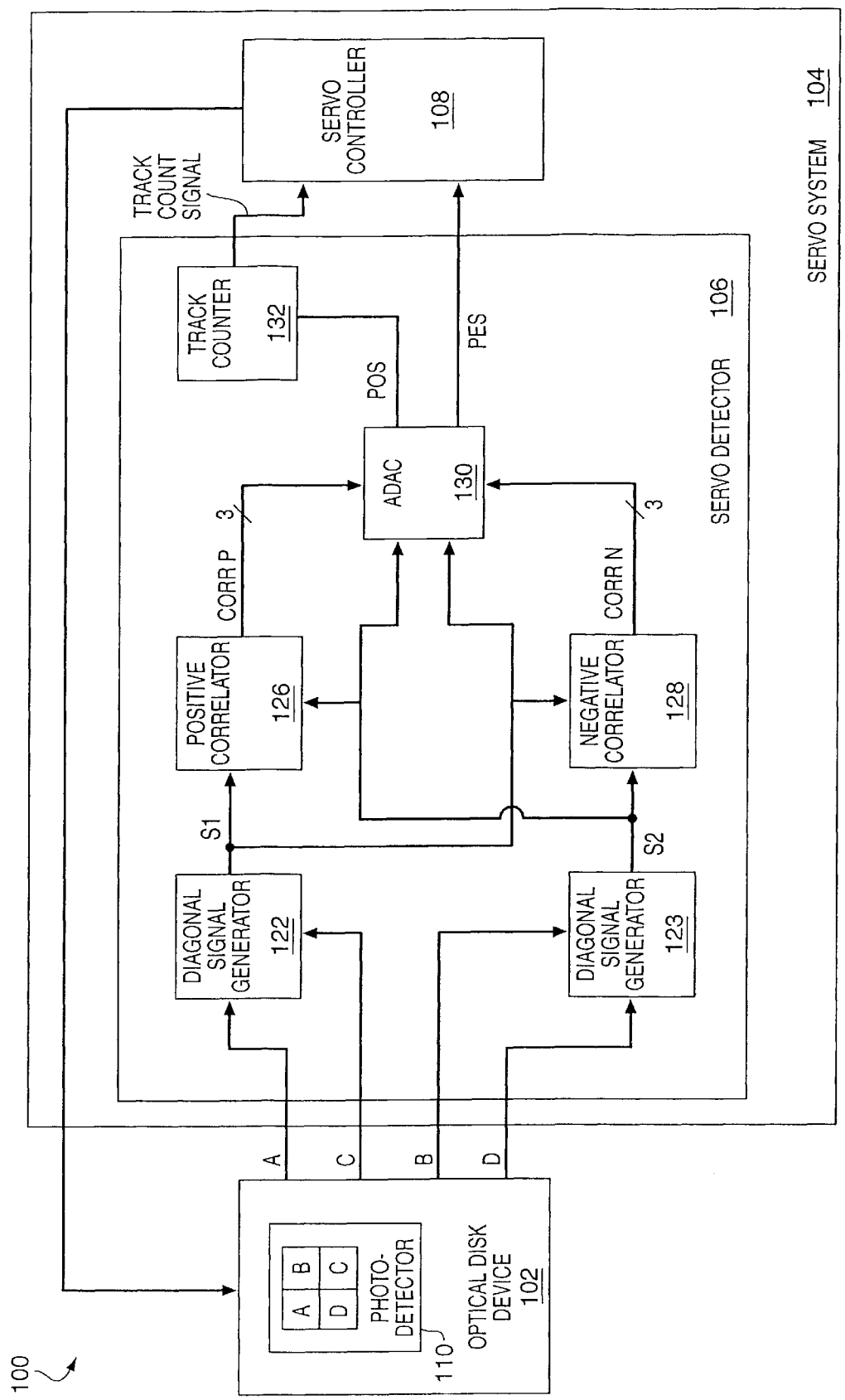
FIG. 1 is a block diagram depicting an optical disk system in the prior art.
Figure 2:
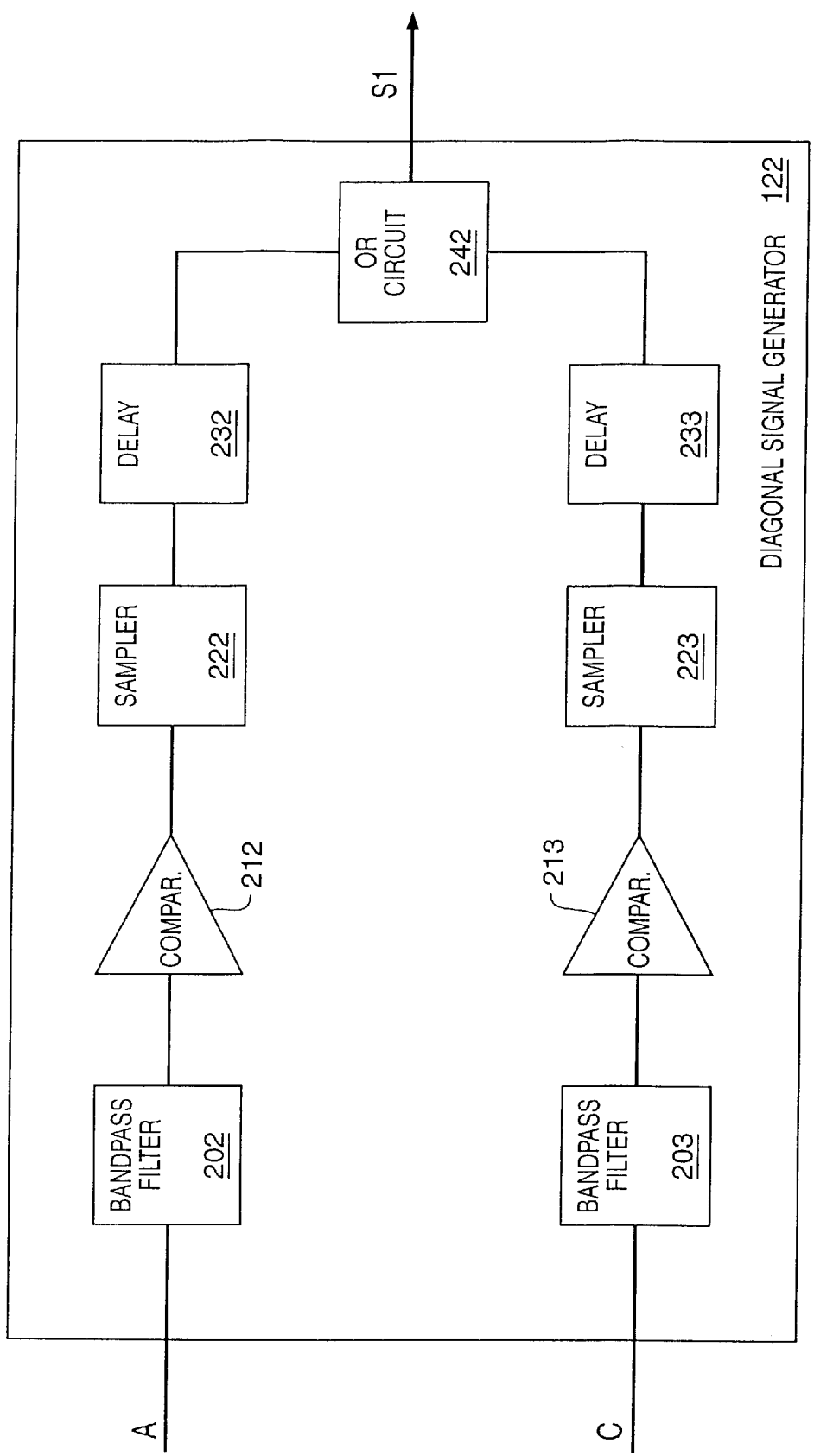
FIG. 2 is a block diagram depicting a diagonal signal generator in the prior art.
Figure 3:
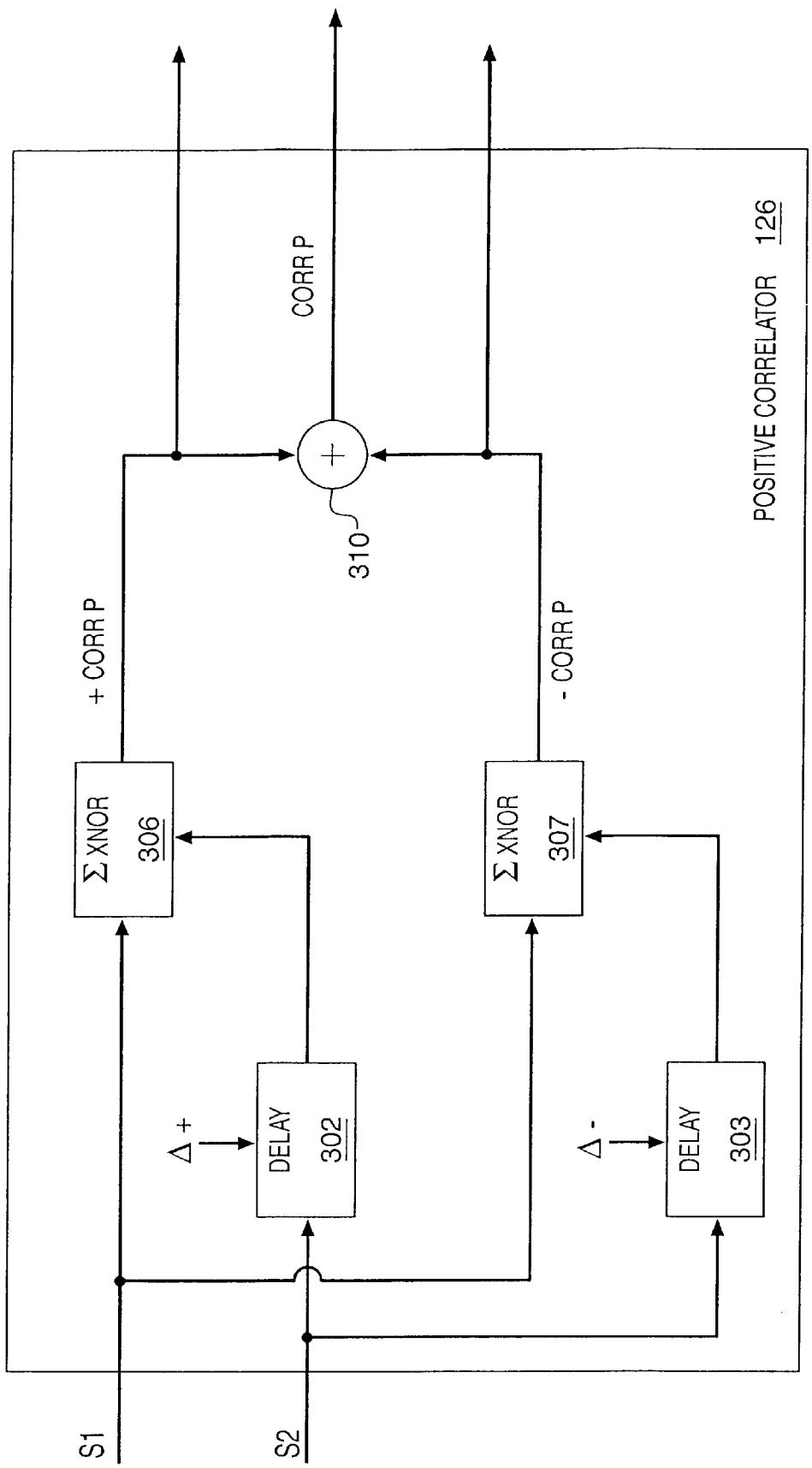
FIG. 3 is a block diagram depicting a positive correlator in the prior art.
Figure 4:
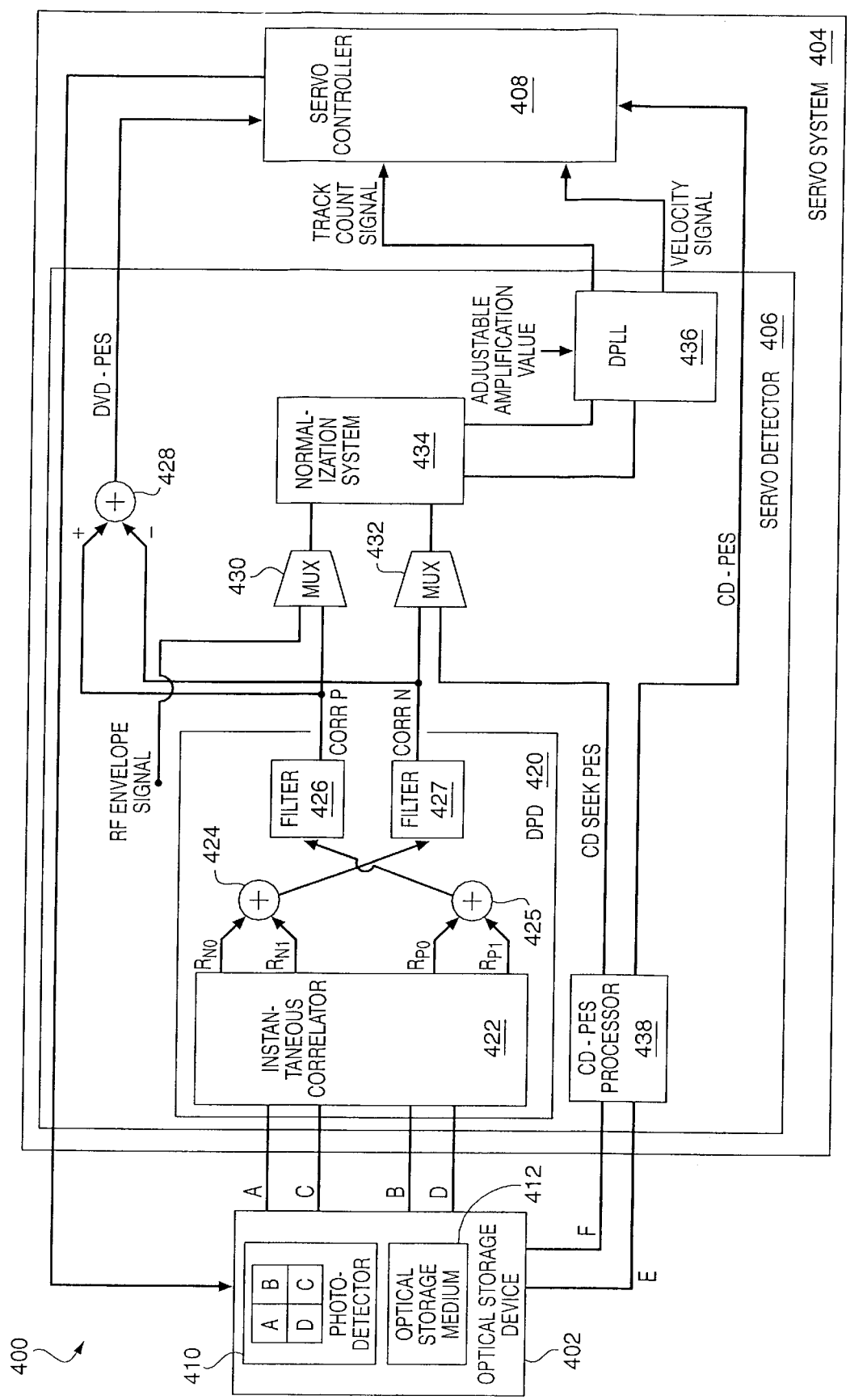
FIG. 4 is a block diagram depicting an optical storage system in an example of the invention.

Optical Storage System Configuration and Operation—FIG. 4

FIG. 4 shows an example of an optical storage system 400 in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 4 has been simplified or omitted for clarity.

Optical storage system 400 is comprised of an optical storage device 402 coupled to servo system 404. Optical storage device 402 is comprised of an optical head (not shown) and optical storage medium 412. The optical head contains an optical transducer (not shown) and four-quadrant photo-detector 410. Servo system 404 is comprised of servo detector 406 coupled to servo controller 408. Servo detector 406 is comprised of differential phase detector (DPD) 420, multiplexer (Mux) 430, multiplexer (Mux) 432, adder 428, normalization system 434, Digital Phase-Locked Loop (DPLL) 436, and Compact Disk-Position Error Signal (CD-PES) processor 438. DPD 420 is comprised of instantaneous correlator 422, adders 424–425, and filters 426–427.

Optical storage device 402 is connected to instantaneous correlator 422 and CD-PES processor 438. Instantaneous correlator 422 is connected to adders 424–425. Adder 424 is connected to filter 427. Filter 427 is connected to Mux 432 and adder 428. Adder 425 is connected to filter 426. Filter 426 is connected to Mux 430 and adder 428. Adder 428 is connected to servo controller 408. Mux 430 is connected to a RF envelope detector (not shown) and normalization system 434. Mux 432 is connected to CD-PES processor 438 and normalization system 434. Normalization system 434 is connected to DPLL 436. DPLL 436 is connected to servo controller 408. CD-PES processor 438 is connected to servo controller 408. Servo controller 408 is connected to optical storage device 402.

Servo system 404 is configured to operate with two types of optical storage medium 412; Digital Video Disks (DVDs) and Compact Disks (CDs). Servo system 404 is further configured to operate with optical storage device 402 while optical storage device 402 performs track following functions and seek functions on both the DVDs and CDs. Servo system 404 is configured to generate a Digital Video Disk-Position Error Signal (DVD-PES), a Compact Disk-Position Error Signal (CD-PES), a track count signal, and a velocity signal. Servo system 404 is configured to control optical storage device 402 for track following functions based on the DVD-PES and the CD-PES. Servo system 404 is configured to control seek functions based on the track count signal and the velocity signal.

The operation of optical storage system 400 is as follows. Optical storage device 402 positions the optical head over optical storage medium 412. The optical transducer projects a light beam onto a surface of optical storage medium 412. The light beam reflects off of pits on optical storage medium 412 and the surface of the optical storage medium 412, and onto photo-detector 410. Photodetector 410 has four quadrants and each quadrant generates a signal. For instance, quadrant B generates a signal B representing the reflection of the light beam captured by quadrant B. If the optical head is centered over a track on the optical storage medium and the track runs parallel to a line between quadrants A and D, then quadrants A–D will see substantially similar light power and generate similar signals. If the optical head is off-center, quadrants A and D will see substantially similar light power and quadrants B and C will see substantially similar light power. The light power is substantially similar for A and D, and substantially similar for B and C, but the phase of the signals is not. The phase is substantially similar for A and C, and substantially similar for B and D. Photo-detector 410 transfers signals A–D to instantaneous correlator 422 in servo system 404.

Optical storage device 402 also generates signals E–F. Most conventional optical heads include an E diode detector and an F diode detector configured to generate signals E and F respectively. If the optical head is on center, signal E and signal F are equal. If the track center is closer to the E diode detector, signal E is larger than signal F. If the track center is closer to the F diode detector, signal F is larger than signal E. Optical storage device 402 transfers signals E–F to CD-PES processor 438.

Signals A–D include encoded user data and embedded tracking error data. A read channel circuit (not shown) processes signals A–D to detect the encoded user data. Servo system 404 processes signals A–D to detect the embedded tracking error data. The embedded tracking error data is not physically written onto optical storage medium 412, but is inherent to optical systems and results from the reflection of the light beam changing as the optical head moves off-track. Servo system 404 uses the embedded tracking error data to generate the DVD-PES, the track count signal, and the velocity signal. Signals E–F also include the embedded tracking error data. Servo system 404 uses the embedded tracking error data from the signals E–F to generate the CD-PES.

Instantaneous correlator 422 receives signals A–D from optical storage device 402. Instantaneous correlator 422 correlates signals A–D to generate RN0, RN1, RP0, and RP1. Instant correlator 422 correlates all four signals A–D in contrast to the prior art that correlated only diagonal signals. For instance, prior art correlators correlate signals A and C producing a first diagonal correlation and correlate signals B and D producing a second diagonal correlation. Instantaneous correlator 422 is not limited to the diagonal correlations because it can correlate all four signals A–D. Instantaneous correlator 422 transfers RN0 and RN1 to adder 424 and RP0 and RP to adder 425.

Adder 424 receives RN0 and RN1 from instantaneous correlator 422. Adder 424 adds RN0 and RN1 to generate a noisy negative correlation signal. Adder 424 transfers the noisy negative correlation signal to filter 427. Filter 427 filters the noisy negative correlation signal to remove the noise and prevent aliasing, and generates a negative correlation signal CorrN. Filter 427 transfers CorrN to adder 428 and Mux 432. Adder 425 receives RP0 and RP1 from instantaneous correlator 422. Adder 425 adds RP0 and RP1 to generate a noisy positive correlation signal. Adder 425 transfers the noisy positive correlation signal to filter 426. Filter 426 filters the noisy positive correlation signal to remove the noise and prevent aliasing, and generates a positive correlation signal CorrP. Filter 426 transfers CorrP to adder 428 and Mux 430.

To generate the DVD-PES, adder 428 receives CorrP from filter 426 and CorrN from filter 427. Adder 428 calculates the difference between CorrP and CorrN by subtracting CorrN from CorrP to generate the DVD-PES. Adder 428 transfers the DVD-PES to servo controller 408. The DVD-PES represents how far off center of the track of optical storage medium 412 the optical head is during track following functions. Servo controller 408 uses the DVD-PES, when optical storage device 402 performs track following functions, to center the optical head over a track on optical storage medium 412 when optical storage medium is a DVD.

To generate the CD-PES, CD-PES processor 438 receives signals E and F from optical storage device 402. CD-PES processor 438 subtracts signal F from signal E to generate an E–F signal. CD-PES processor 438 converts the E–F signal from analog to digital to generate the CD-PES. CD-PES processor 438 transfers the CD-PES to servo controller 408. The CD-PES represents how far off center of the track of optical storage medium 412 the optical head is during track following functions. Servo controller 408 uses the CD-PES, when optical storage device 402 performs track following functions, to center the optical head over a track on optical storage medium 412 when optical storage medium 412 is a CD.

To generate the track count signal and the velocity signal, Mux 430 receives CorrP from filter 426 and a RF envelope signal from a RF envelope detector (not shown). The RF envelope detector is a conventional component understood by those skilled in the art to detect the RF envelope of a signal. The RF envelope signal is sinusoidal during seeks where a cycle represents a track crossing. For instance, the real number representation of the number of tracks crossed since the start of the seek is given by $Rf_{env}(TC)=A*\cos(2*pi*TC)$, where TC represents track crossings and A represents one-half the difference in the RF envelope between on and off track. Mux 430 transfers CorrP or the RF envelope signal depending on whether optical storage medium 412 is a DVD or a CD. Mux 430 transfers CorrP to normalization system 434 if optical storage medium 412 is a DVD. Mux 430 transfers the RF envelope signal to normalization system 434 if optical storage medium 412 is a CD.

Mux 432 receives CorrN from filter 427 and a CD seek PES from CD-PES processor 438. CD-PES processor 438 generates the CD seek PES by subtracting signal F from signal E, and digitizing signal E–F with an Analog-to-Digital converter. Mux 432 transfers CorrN or the CD seek PES depending on whether optical storage medium 412 is a DVD or a CD. Mux 432 transfers CorrN to normalization system 434 if optical storage medium 412 is a DVD. Mux 432 transfers the CD seek PES to normalization system 434 if optical storage medium 412 is a CD.

Normalization system 434 receives either CorrP and CorrN, or the RF envelope signal and the CD seek PES. Normalization system 434 centers the received signals about a reference point and adjusts the amplitude of the received signals to match some reference amplitude to generate a first normalized signal and a second normalized signal. Normalization system 434 transfers the first and second normalized signals to DPLL 436.

DPLL 436 receives an adjustable amplification value along with the first normalized signal and the second normalized signal. DPLL 436 generates the track count signal and the velocity signal based on the adjustable amplification value, the first normalized signal and the second normalized signal. DPLL 436 transfers the track count signal and the velocity signal to servo controller 408. The track count signal represents the number of tracks the optical head crosses during a seek. The velocity signal represents a velocity at which an optical head passes over tracks on optical storage medium 412. Servo controller 408 uses the track count signal and the velocity signal to position the optical head during a seek function.

Optical storage system 400 advantageously maps variable parameters into a digital realm. Thus, compensation for the variable parameters is a problem that can be solved digitally. The digital solutions are more consistent than analog solutions. For instance, a prior art analog phase detector measures a diagonal signal time difference directly. The prior art systems could not digitally measure the time difference because the clock required would have to be 10 times higher than with the present invention. DPD 420 transforms the problem from the time domain to the amplitude domain with the correlations. DPD 420 takes advantage of the fact that underlying servo information is much slower than pit and land frequency.

Figure 5:
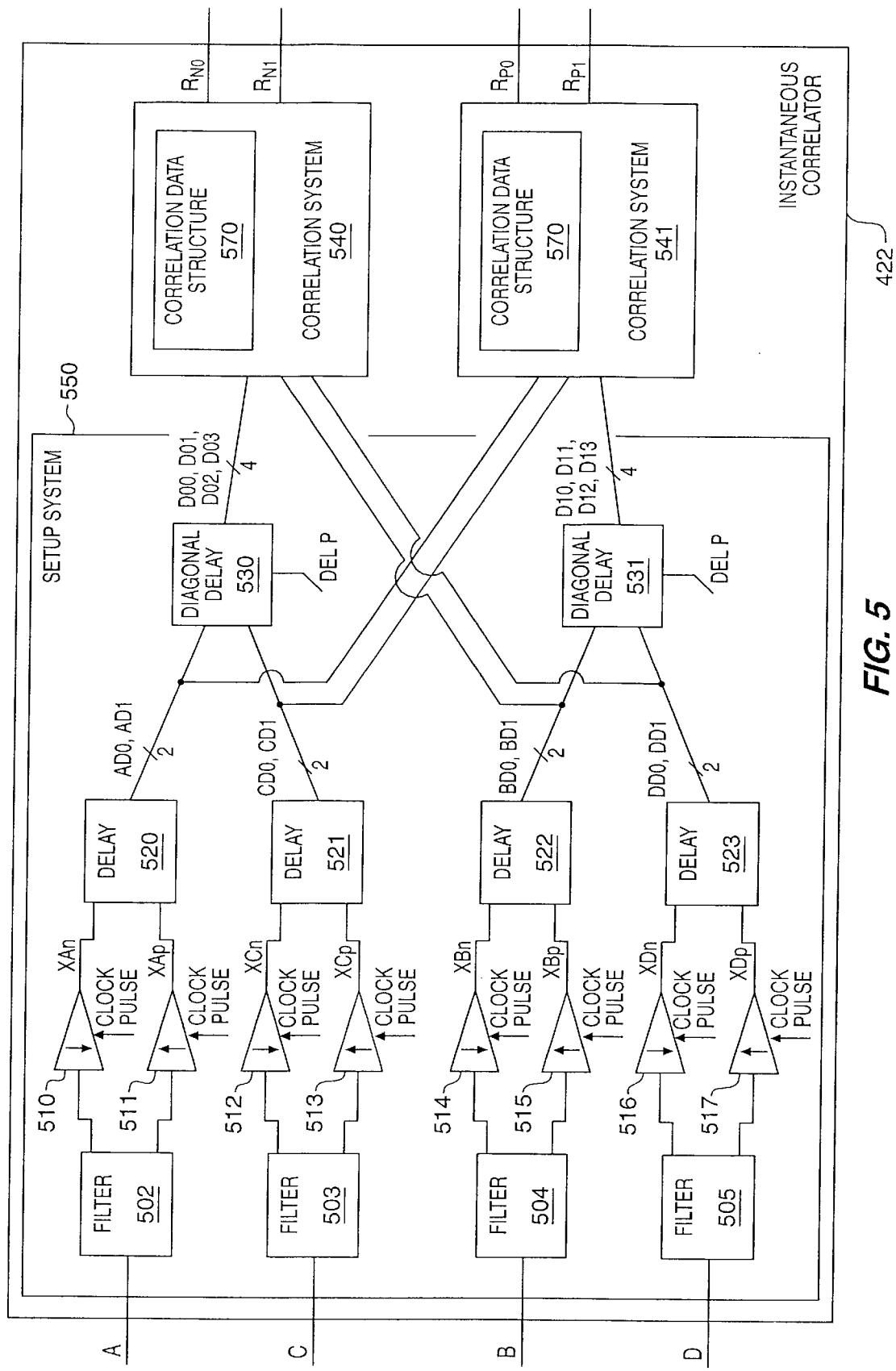
FIG. 5 is a block diagram depicting an instantaneous correlator in an example of the invention.

Instantaneous Correlator Configuration and Operation—FIG. 5

FIG. 5 shows an example of instantaneous correlator 422 in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 5 has been simplified or omitted for clarity.

Instantaneous correlator 422 is comprised of setup system 550 and correlation systems 540–541. Setup system 550 is comprised of filters 502–505, samplers 510–517, delays 520–523, and diagonal delays 530–531. Correlation systems 540–541 contain a correlation data structure 570. The samplers 510–517 are comparators that are sampled. Alternatively, samplers 510–517 could be 1-bit A/D converters. Extending samplers 510–517 to multi-bit A/D converters does not appreciably improve the performance of servo system 104. Filter 502 is connected to samplers 510–511. Samplers 510–511 are connected to delay 520. Delay 520 is connected to diagonal delay 530 and correlation system 541. Diagonal delay 530 is connected to correlation system 540. Filter 503 is connected to samplers 512–513. Samplers 512–513 are connected to delay 521. Delay 521 is connected to diagonal delay 530 and correlation system 541. Filter 504 is connected to samplers 514–515. Samplers 514–515 are connected to delay 522. Delay 522 is connected to diagonal delay 531 and correlation system 540. Diagonal delay 531 is connected to correlation system 541. Filter 505 is connected to samplers 516–517. Samplers 516–517 are connected to delay 523. Delay 523 is connected to diagonal delay 531 and correlation system 540.

In operation, filter 502 receives analog signal A from optical storage device 402. Filter 502 filters signal A to attenuate noise and transfers a filtered signal A to samplers 510–511. Samplers 510–511 receive the filtered signal A and a clock pulse. The clock pulse could be for example a 118.54 MHz pulse. Sampler 511 samples the filtered signal A on a rising edge of the clock pulse to generate sample XAp. Sampler 511 transfers XAp to delay 520. Sampler 510 samples the filtered signal A on a falling edge of the clock pulse to generate sample XAn. Sampler 510 transfers XAn to delay 520. Delay 520 delays XAp and XAn by one-half of the clock pulse to account for improper pit depths on optical storage medium 412 and generates samples AD0 and AD1. Delay 520 transfers AD0 and AD1 to diagonal delay 530 and to correlation system 541.

Filter 503 receives analog signal C from optical storage device 402. Filter 503 filters signal C to attenuate noise and transfers a filtered signal C to samplers 512–513. Samplers 512–513 receive the filtered signal C and the clock pulse. Sampler 513 samples the filtered signal C on the rising edge of the clock pulse to generate sample XCp. Sampler 513 transfers XCp to delay 521. Sampler 512 samples the filtered signal C on the falling edge of the clock pulse to generate sample XCn. Sampler 512 transfers XCn to delay 521. Delay 521 delays XCp and XCn to account for improper pit depths on optical storage medium 412 and generates samples CD0 and CD1. Delay 521 transfers CD0 and CD1 to diagonal delay 530 and to correlation system 541.

Filter 504 receives analog signal B from optical storage device 402. Filter 504 filters signal B to attenuate noise and transfers a filtered signal B to samplers 514–515. Samplers 514–515 receive the filtered signal B and the clock pulse. Sampler 515 samples the filtered signal B on the rising edge of the clock pulse to generate sample XBp. Sampler 515 transfers XBp to delay 522. Sampler 514 samples the filtered signal B on the falling edge of the clock pulse to generate sample XBn. Sampler 514 transfers XBn to delay 522. Delay 522 delays XBp and XBn to account for improper pit depths on optical storage medium 412 and generates samples BD0 and BD1. Delay 522 transfers BD0 and BD1 to diagonal delay 531 and to correlation system 540.

Filter 505 receives analog signal D from optical storage device 402. Filter 505 filters signal D to attenuate noise and transfers a filtered signal D to samplers 516–517. Samplers 516–517 receive the filtered signal D and the clock pulse. Sampler 517 samples the filtered signal D on the rising edge of the clock pulse to generate sample XDp. Sampler 517 transfers XDp to delay 523. Sampler 516 samples the filtered signal D on the falling edge of the clock pulse to generate sample XDn. Sampler 516 transfers XDn to delay 523. Delay 523 delays XDp and XDn to account for improper pit depths on optical storage medium 412 and generates samples DD0 and DD1. Delay 523 transfers DD0 and DD1 to diagonal delay 531 and to correlation system 540.

Diagonal delay 530 receives AD0 and AD1 from delay 520, CD0 and CD1 from delay 521, and a delay constant DelP. Diagonal delay 530 delays AD0, AD1, CD0, and CD1 by DelP to generate samples D00, D01, D02, and D03. DelP is set to obtain a higher phase difference between CorrP and CorrN. The higher phase difference causes an increased amplitude in DVD-PES. Diagonal delay 530 transfers D00, D01, D02, and D03 to correlation system 540. Diagonal delay 531 receives BD0 and BD1 from delay 522, DD0 and DD1 from delay 523, and DelP. Diagonal delay 531 delays BD0, BD1, DD0, and DD1 by DelP to generate samples D10, D11, D12, and D13. Diagonal delay 531 transfers D10, D11, D12, and D13 to correlation system 541.

Correlation system 540 receives D00, D01, D02, and D03 from diagonal delay 530, BD0 and BD1 from delay 522, and DD0 and DD1 from delay 523. Correlation system 540 enters D00, D02, BD0, and DD0 into correlation data structure 570. Correlation data structure 570 yields a correlation value RN0 based on D00, D02, BD0, and DD0. In the prior art, a system correlates diagonal signals using the following summation: $R_{xy}(t)=\Sigma\{x(i)*y(i-t)\}$. Correlation system 540 uses correlation data structure 570 to get $\{x(i)*y(i-t)\}$ to account for all combinations of signals A–D. Correlation system 540 enters D01, D03, BD1, and DD1 into correlation data structure 570. Correlation data structure 570 yields correlation value RN1 based on D01, D03, BD1, and DD1. Correlation system 540 transfers RN0 and RN1 to adder 424. Correlation system 541 receives D10, D11, D12, and D13 from diagonal delay 531, AD0 and AD1 from delay 520, and CD0 and CD1 from delay 521. Correlation system 541 enters D10, D12, AD0, and CD0 into correlation data structure 570. Correlation data structure 570 yields correlation value RP0 based on D10, D12, AD0, and CD0. Correlation system 541 enters D11, D13, AD1, and CD1 into correlation data structure 570. Correlation data structure 570 yields correlation value RP1 based on D11, D13, AD1, and CD1. Correlation system 541 transfers RP0 and RP1 to adder 425.

Instantaneous correlator 422 advantageously correlates signals A–D using correlation data structure 570 instead of correlating diagonal signals. Prior art correlators add two quadrant signals to generate a diagonal signal. The adder subjects the prior art correlator to lens shift errors. Instantaneous correlator 422 is less prone to lens shift errors and is simpler to implement.

Correlation Data Structure—FIG. 6

FIG. 6 shows an example of a correlation data structure 600 in accord with the present invention. Those skilled in the art will appreciate numerous variations from this example that do not depart from the scope of the invention.

Correlation data structure 600 represents a correlation algorithm that correlates four signals. The values in columns W, X, Y, and Z represent the signals to be correlated to generate a correlation signal. The values in column R(p,n) (0,1) represent the correlation signal.

As an example, correlation system 540 in FIG. 5 could use correlation data structure 600 to correlate D00, D02, BD0, and DD0. Correlation system 540 enters D00, D02, BD0, and DD0 into correlation data structure 600 as W, X, Y, and Z respectively. Correlation data structure 600 yields correlation value Rn0 that is a function of D00, D02, BD0, and DD0. From correlation data structure 600, for instance, if D00=1, D02=0, BD0=1, and DD0=1, then Rn0 equals 0.

Correlation data structure 600 is an advantage over the prior art. Correlation table 600 is simpler than the prior systems for correlating signals. Correlation table 600 correlates four signals instead of just diagonals signal making an optical storage system less prone to lens shift errors.

Figure 7:
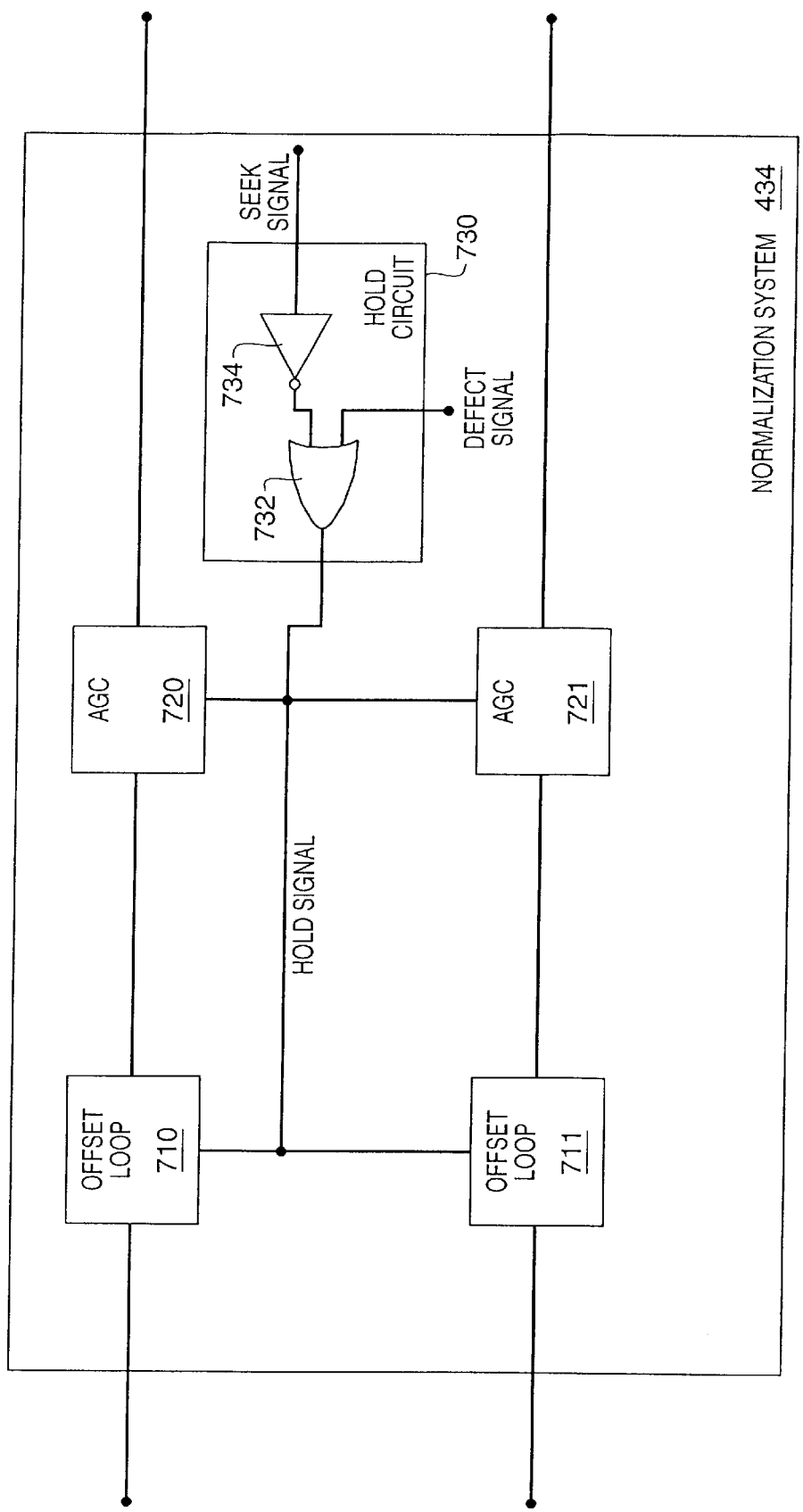
FIG. 7 is a block diagram depicting a normalization system in an example of the invention.

Normalization System Configuration and Operation—FIG. 7

FIG. 7 shows an example of normalization system 434 in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 7 has been simplified or omitted for clarity.

Normalization system 434 is comprised of offset loop 710–711, Automatic Gain Controls (AGC) 720–721, and hold circuit 730. Hold circuit 730 is comprised of inverter circuit 734 and OR circuit 732. Offset loop 710 is connected to AGC 720. Offset loop 711 is connected to AGC 721. Inverter 734 is connected to OR circuit 732. OR circuit 732 is connected to offset loops 710–711 and AGCs 720–721.

In operation, offset loop 710 receives a first signal from Mux 430. Offset loop 710 centers the first signal about a reference axis to generate a first centered signal. The reference axis could be a zero y-axis. Offset loop 710 transfers the first centered signal to AGC 720. AGC 720 adjusts the amplitude of the first centered signal to a reference amplitude to generate a first normalized signal. AGC 720 transfers the first normalized signal to DPLL 436. Offset loop 711 receives a second signal from Mux 432. Offset loop 711 centers the second signal about the reference axis to generate a second centered signal. Offset loop 711 transfers the second centered signal to AGC 721. AGC 721 adjusts the amplitude of the second centered signal to the reference amplitude to generate a second normalized signal. AGC 721 transfers the second normalized signal to DPLL 436. The first normalized signal and the second normalized signal could have an offset close to zero and a peak amplitude between 1 and 2.

Hold circuit 730 controls the operation of normalization circuit 434. Inverter circuit 734 receives a seek signal that indicates when optical storage device 402 is performing a seek function. Inverter circuit 734 inverts the seek signal and transfers the inverted seek signal to OR circuit 732. OR circuit 732 receives the inverted seek signal and a defect signal. The defect signal indicates when a defect has been detected in reading optical storage medium 412. OR circuit 732 generates a hold signal based on the inverted seek signal and the defect signal. If optical storage device 402 is performing a seek function and no defect is detected during the seek, the hold signal indicates to offset loops 710–711 and AGCs 720–721 to function as described above. If optical storage device 402 is not in seek mode or when a defect is detected during the seek, the hold signal indicates offset loops 710–711 and AGCs 720–721 to hold their present states until hold circuit 730 allows for normal operation.

Normalization circuit 434 advantageously provides gain and offset control during defect and non-seeking periods. Current normalization systems are analog architectures and have limited hold capabilities because of finite leakage currents on hold capacitors. Normalization circuit 434 holds values in registers and is not subject to decay.

Figure 8:
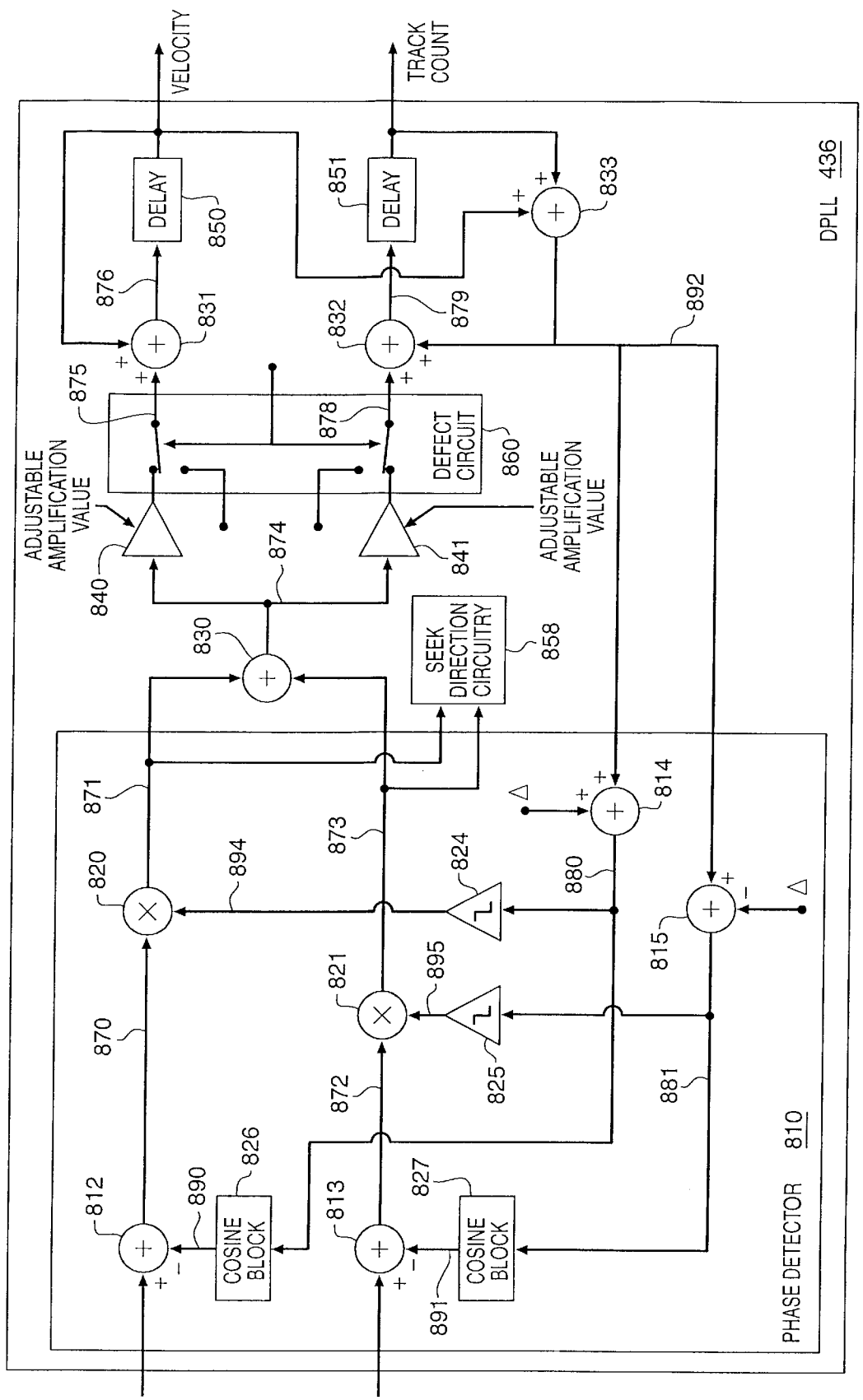
FIG. 8 is a block diagram depicting a digital phase-locked loop in an example of the invention.

DPLL Configuration and Operation—FIG. 8

FIG. 8 shows an example of DPLL 436 in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 8 has been simplified or omitted for clarity.

DPLL 436 is configured to calculate the velocity signal and the track count signal and is comprised of a phase detector 810, adders 830–833, amplifiers 840–841, delays 850–851, a defect circuit 860, and seek direction circuitry 858. Phase detector 810 is comprised of adders 812–815, multipliers 820–821, slicers 824–825, and cosine blocks 826–827. Adder 812 is connected to multiplier 820. Multiplier 820 is connected to adder 830 and seek direction circuitry 858. Adder 830 is connected to amplifier 840. Amplifier 840 is connected to defect circuit 860. Defect circuit 860 is connected to adder 831. Adder 831 is connected to delay 850. Delay 850 is connected to adder 833 and adder 831 forming a feedback loop. Adder 813 is connected to multiplier 821. Multiplier 821 is connected to adder 830 and seek direction circuitry 858. Adder 830 is connected to amplifier 841. Amplifier 841 is connected to defect circuit 860. Defect circuit 860 is connected to adder 832. Adder 832 is connected to delay 851. Delay 851 is connected to adder 833. Adder 833 is connected to adders 814–815 and adder 832 forming a feedback loop. Adder 814 is connected to slicer 824 and cosine block 826. Slicer 824 is connected to multiplier 820. Cosine block 826 is connected to adder 812 forming a feedback loop. Adder 815 is connected to slicer 825 and cosine block 827. Slicer 825 is connected to multiplier 821. Cosine block 827 is connected to adder 813 forming a feedback loop.

In operation, adder 812 receives a first normalized signal and a feedback signal 890. Adder 812 adds the first normalized signal and feedback signal 890 to generate signal 870. Adder 812 transfers signal 870 to multiplier 820. Multiplier 820 receives signal 870 and a first sliced signal 894. Multiplier 820 multiplies signal 870 and the first sliced signal 894 to generate a first error signal 871. Multiplier 820 transfers the first error signal 871 to adder 830. Adder 813 receives a second normalized signal and a feedback signal 891. Adder 813 adds the second normalized signal and feedback signal 891 to generate signal 872. Adder 813 transfers signal 872 to multiplier 821. Multiplier 821 receives signal 872 and a second sliced signal 895. Multiplier 821 multiplies signal 872 and the second sliced signal 895 to generate a second error signal 873. Multiplier 821 transfers the second error signal 873 to adder 830.

To estimate the velocity signal, adder 830 receives the first error signal 871 and the second error signal 873. Adder 830 adds the first error signal and the second error signal to generate signal 874. Adder 830 transfers signal 874 to amplifier 840 and amplifier 841. Amplifier 840 receives signal 874 and the adjustable amplification value. Amplifier 840 increases the gain of signal 874 based on the adjustable amplification value to generate signal 875. The adjustable amplification value assists in determining the bandwidth of DPLL 436. For instance, if the adjustable amplification value is large, DPLL 436 changes the velocity signal quickly. If the adjustable amplification value is smaller, DPLL 436 takes longer to change the velocity signal. Amplifier 840 transfers signal 875 to adder 831. Adder 831 receives signal 875 and the velocity signal, where the velocity signal is a feedback signal. Adder 831 adds signal 875 and the velocity signal to generate signal 876. Adder 831 transfers signal 876 to delay 850. Delay 850 latches signal 876 so that signal 876 is stable. The delayed signal 876 is the velocity signal.

To calculate the track count signal, amplifier 841 receives signal 874 and the adjustable amplification value. Amplifier 841 increases the gain of signal 874 based on the adjustable amplification value to generate signal 878. The adjustable amplification value assists in determining the bandwidth of DPLL 436. Amplifier 841 transfers signal 878 to adder 833. Adder 832 receives signal 878 and a feedback signal 892. Adder 832 adds signal 878 and feedback signal 892 to generate signal 879. Adder 833 transfers signal 879 to delay 851. Delay 851 latches signal 879 so that signal 879 is stable. The delayed signal 879 is the track count signal.

DPLL 436 uses feedback loops to generate the velocity signal and the track count signal. Feedback signals 890–895 are generated as follows. Adder 833 receives the velocity signal from delay 850 and the track count signal from delay 851. Adder 833 adds the velocity signal and the track count signal to generate feedback signal 892. Adder 833 transfers feedback signal 892 to adders 832 and 814–815. Adder 814 receives feedback signal 892 and a predetermined offset Δ. The predetermined offset Δ is a function of spin speed and optical properties of optical storage medium 412 and is an expected phase difference between the first normalized signal and the second normalized signal. The predetermined offset Δ is necessary because the first and second normalized signals coming into DPLL 436 are out of phase by approximately 2*Δ. Adder 814 adds feedback signal 892 and Δ to generate signal 880. Adder 814 transfers signal 880 to slicer 824 and cosine block 826. Slicer 824 slices signal 880 to generate the first sliced signal 894. Slicer 824 transfers the first sliced signal 894 to multiplier 820. Cosine block 826 estimates a value of the first normalized signal based on signal 980 and generates feedback signal 890. Cosine block 826 is a table lookup. For example, if signal 880 feeds back a ⅛ track, then signal 890 equals cos[2*pi*⅛] or 1/sqrt(2). If signal 880 feeds back track 667 ⅛, for instance, then signal 890 equals cos[2*pi*(667 ⅛)]. Cosine block 826 transfers feedback signal 890 to adder 812. Adder 815 receives feedback signal 892 and Δ. Adder 815 subtracts Δ from feedback signal 892 to generate signal 881. Adder 815 transfers signal 881 to slicer 825 and cosine block 827. Slicer 825 slices signal 881 to generate the second sliced signal 895. Slicer 825 transfers the second sliced signal 895 to multiplier 821. Cosine block 827 estimates a value of the second normalized signal based on signal 981 and generates feedback signal 891. Cosine block 827 transfers feedback signal 891 to adder 813.

DPLL 436 suspends operation if a defect is detected during a seek function. Defect circuit 860 allows DPLL 436 to continue to count tracks when a defect has obliterated or corrupted the data on optical storage medium 412. When the defect has been detected, defect circuit 860 switches the inputs of adders 831 and 833 to zero. Defect circuit 860 holds the velocity signal constant. Defect circuit 860 allows DPLL 436 to count tracks because the velocity signal drives one input to adder 834.

When the defect ends, defect circuit again connects adders 831 and 833 to amplifiers 840 and 841 respectively and DPLL 436 operates normally. If the velocity did not changed appreciably during the defect, the track count will be accurate. If the velocity has changed, the track count error will be proportional to the acceleration during the defect and the defect length.

Seek direction circuitry 858 estimates the direction of a seek. To do so, seek direction circuitry 858 receives signal 871 and signal 873. Seek direction circuitry 858 processes signals 871 and 873 and determines the offset between the two signals. Seek direction circuitry estimates the direction of a seek based on the determined offset. Seek direction circuitry 858 transfers seek direction information.

DPLL 436 advantageously has an adjustable bandwidth that is changed by adjusting amplifiers 840 and 841. Servo firmware adjusts DPLL 436 to have a low bandwidth during high velocity seeks when the input signal quality is very poor. Thus, DPLL 436 counts at much higher velocities than the prior art. Prior art track counters can only improve the quality of track counts at high speed by implementing a different band-pass filter at the input to the track counter. DPLL 436 is its own band-pass filter.

Also, DPLL 436 uses an estimate of the velocity to filter out unlikely counts. The prior art track counters typically have no memory of when a previous count occurred. A noise glitch could cause a count change immediately after a previous change even though the actual seek velocity is slow.

DPLL 436 easily holds states, like the last determined velocity, during a defect. Prior art analog PLLs hold a velocity value in a capacitor. The capacitor does not function well to hold the velocity value due to leakage currents.

Phase detector 810 advantageously determines phase error over an entire period of incoming sinusoids. Analog PLLs in the prior art use a slicer-based phase detector to put current pulses into an integrating capacitor. The analog PLLs increase noise and give updates only every half-track crossing. Because track crossing rates vary greatly over a seek, phase error repetition rates also vary greatly making it difficult to filter optimally.

Those skilled in the art will appreciate variations of the above-described embodiments that fall within the scope of the invention. As a result, the invention is not limited to the specific examples and illustrations discussed above, but only by the following claims and their equivalents.

We claim:
1. A method for generating a track count signal that represents track crossings on an optical storage medium, responsive to a light beam reflected off of the optical storage medium and detecting the reflected light beam with a detector, the method comprising:
receiving a first quadrant signal, a second quadrant signal, a third quadrant signal, and a fourth quadrant signal from the detector;
correlating the first quadrant signal, the second quadrant signal, the third quadrant signal, and the fourth quadrant signal to generate a first correlation signal;
correlating the first quadrant signal, the second quadrant signal, the third quadrant signal, and the fourth quadrant signal to generate a second correlation signal;

receiving an adjustable amplification value; and generating the track count signal based the first correlation signal, the second correlation signal, and the adjustable amplification value.

2. The method of claim 1 further including centering the first correlation signal and the second correlation signal about a reference axis.

3. The method of claim 1 further including adjusting the amplitude of the first correlation signal and the second correlation signal to a reference amplitude.

4. The method of claim 1 wherein correlating the first quadrant signal, the second quadrant signal, the third quadrant signal, and the fourth quadrant signal to generate the first correlation signal and the second correlation signal further comprises generating a first correlation value, a second correlation value, a third correlation value, and a fourth correlation value based on entering the first quadrant signal, the second quadrant signal, the third quadrant signal, and the fourth quadrant signal in a correlation data structure.

5. The method of claim 4 further comprising adding the first correlation value and the second correlation value to generate the first correlation signal.

6. The method of claim 4 further comprising adding the third correlation value and the fourth correlation value to generate the second correlation signal.

7. The method of claim 1 further comprising estimating a direction of a seek relative to the optical storage medium based on an offset between the first correlation signal and the second correlation signal.

8. Servo circuitry for generating a track count signal that represents track crossings on an optical storage medium, responsive to a light beam reflected off of tie optical storage medium and detecting the reflected light beam with a detector, the servo circuitry comprising:

a differential phase detector configured to receive a first quadrant signal, a second quadrant signal, a third quadrant signal, and a fourth quadrant signal from the detector, correlate the first quadrant signal, the second quadrant signal, the third quadrant signal, and the fourth quadrant signal to generate a first correlation signal, correlate the first quadrant signal, the second quadrant signal, the third quadrant signal, and the fourth quadrant signal to generate a second correlation signal, and transfer the first correlation signal and the second correlation signal; and a digital phase-locked loop configured to receive the first correlation signal, the second correlation signal, and an adjustable amplification value, and generate the track count signal based on the first correlation signal, the second correlation signal, and the adjustable amplification value.

9. The servo circuitry of claim 8 further comprising a normalization system coupled to the differential phase detector and the digital phase-locked loop and configured to center the first correlation signal and the second correlation signal about a reference axis.

10. The servo circuitry of claim 8 further comprising a normalization system coupled to the differential phase detector and the digital phase-locked loop and configured to adjust the amplitude of the first correlation signal and the second correlation signal to a reference amplitude.

11. The servo circuitry of claim 8 wherein the differential phase detector is comprised of an instantaneous correlator configured to receive the first quadrant signal, the second quadrant signal, the third quadrant signal, and the fourth quadrant signal, generate a first correlation value, a second correlation value, a third correlation value, and a fourth correlation value based on entering the first quadrant signal, the second quadrant signal, the third quadrant signal, and the fourth quadrant signal in a correlation data structure, and transfer the first correlation value, the second correlation value, the third correlation value, and the fourth correlation value.

12. The servo circuitry of claim 11 wherein the differential phase detector further comprises a first adder coupled to the instantaneous correlator and configured to receive the first correlation value and the second correlation value, add the first correlation value and the second correlation value to generate the first correlation signal, and transfer the first correlation signal.

13. The servo circuitry of claim 11 wherein the differential phase detector further comprises a second adder coupled to the instantaneous correlator and configured to receive the third correlation value and the fourth correlation value, add the third correlation value and the fourth correlation value to generate the second correlation signal, and transfer the second correlation signal.

14. The servo circuitry of claim 8 wherein the digital phase-locked loop is further configured to estimate a direction of a seek relative to the optical storage medium based on a phase offset between the first correlation signal and the second correlation signal.

15. A method for generating a first track count signal that represents track crossings on an optical storage medium, responsive to receiving a first signal and a second signal, the method comprising:

receiving the first signal and the second signal and generating a first error signal based on the first signal and a second error signal based on the second signal;

adding the first error signal and the second error signal to generate a third error signal;

receiving an adjustable amplification value and amplifying the third error signal based on the adjustable amplification value to generate an amplified third error signal;

receiving a feedback signal that represents a velocity signal added to the first track count signal and adding the amplified third error signal and the feedback signal to generate a second track count signal; and delaying the second track count signal to generate the first track count signal.

16. The method of claim 15 further comprising receiving a phase offset signal that represents an estimated phase difference between the first signal and the second signal and estimating the first signal based on the phase offset signal.

17. The method of claim 15 further comprising receiving a phase offset signal that represents an estimated phase difference between the first signal and the second signal and estimating the second signal based on the phase offset signal.

18. The method of claim 15 wherein the first signal represents a first correlation signal generated by a differential phase detector.

19. The method of claim 15 wherein the second signal represents a second correlation signal generated by a differential phase detector.

20. The method of claim 15 wherein the velocity signal represents a velocity at which an optical head passes over tracks on the optical storage medium.

21. The method of claim 15 further comprising estimating a direction of a seek relative to the optical storage medium based on a phase offset between the first error signal and the second error signal.

22. The method of claim 15 further comprising estimating the first signal and the second signal based on a fraction of the track count signal.

23. Servo circuitry for generating a first track count signal that represents track crossings on an optical storage medium, responsive to receiving a first signal and a second signal, the servo circuitry comprising:

a phase error detector configured to receive the first signal and the second signal, generate a first error signal based on the first signal, generate a second error signal based on the second signal, and transfer the first error signal and the second error signal;

a first adder coupled to the phase error detector and configured to receive the first error signal and the second error signal, add the first error signal and the second error signal to generate a third error signal, and transfer the third error signal;

an amplifier coupled to the adder and configured to receive the third error signal and an adjustable amplification value, amplify the third error signal based on the adjustable amplification value to generate an amplified third error signal, and transfer the amplified third error signal;

a second adder coupled to the amplifier and configured to receive the amplified third error signal and a feedback signal that represents a velocity signal added to the first track count signal and add the amplified third error signal and the feedback signal to generate a second track count signal; and a delay coupled to second adder and configured to receive the second track count signal, delay the second track count signal to generate the first track count signal, and transfer the first track count signal.

24. The servo circuitry of claim 23 wherein the phase error detector is further configured to receive a phase offset signal that represents an estimated phase difference between the first signal and the second signal and estimate the first signal based on the phase offset signal.

25. The servo circuitry of claim 23 wherein the phase error detector is further configured to receive a phase offset signal that represents an estimated phase difference between the first signal and the second signal and estimate the second signal based on the phase offset signal.

26. The servo circuitry of claim 23 wherein the first signal represents a first correlation signal generated by a differential phase detector.

27. The servo circuitry of claim 23 wherein the second signal represents a second correlation signal generated by a differential phase detector.

28. The servo circuitry of claim 23 wherein the velocity signal represents a velocity at which an optical head passes over tracks on the optical storage medium.

29. The servo circuitry of claim 23 further comprising a defect circuit coupled to the second adder and the amplifier and configured to de-couple the amplifier from the second adder if a defect is detected during track counting.

30. The servo circuitry of claim 23 further comprising seek direction circuitry coupled to the phase error detector and configured to receive the first error signal and the second error signal, process the first error signal and the second error signal to determine an offset between the first error signal and the second error signal, estimate a direction of a seek relative to the optical storage medium based on the offset, and transfer direction information.

31. The servo circuitry of claim 23 wherein the phase error detector is further configured to estimate the first signal and the second signal based on a fraction of the track count signal.

32. A method for generating a track count signal that represents track crossings on an optical storage medium, the method comprising:

receiving a first correlation signal and a first compact disk signal in a first multiplexer, transferring the first correlation signal if the optical storage medium is a digital video disk, and transferring the first compact disk signal if the optical storage medium is a compact disk;

receiving a second correlation signal and a second compact disk signal in a second multiplexer, transferring the second correlation signal if the optical storage medium is a digital video disk, and transferring the second compact disk signal it the optical storage medium is a compact disk;

receiving the first correlation signal and the second correlation signal in a digital phase-locked loop and generating the track count signal based on the first correlation signal and the second correlation signal if the optical storage medium is a digital video disk; and receiving the first compact disk signal and the second compact disk signal in the digital phase-locked loop and generating the track count signal based on the first compact disk signal and the second compact disk signal if the optical storage medium is a compact disk.

33. The method of claim 32 further comprising receiving a first quadrant signal, a second quadrant signal, a third quadrant signal, and a fourth quadrant signal in a differential phase detector and generating the first correlation signal and the second correlation signal based on the first quadrant signal, the second quadrant signal, the third quadrant signal, and the fourth quadrant signal.

34. The method of claim 32 wherein the first compact disk signal represents a radio frequency envelope signal from a radio frequency envelope detector.

35. The method of claim 32 wherein the second compact disk signal represents a compact disk position error signal generated by a compact disk position error signal processor.

36. Servo circuitry for generating a track count signal that represents track crossings on an optical storage medium, the servo circuitry comprising:

a first multiplexer configured to receive a first correlation signal and a first compact disk signal, transfer the first correlation signal if the optical storage medium is a digital video disk, and transfer the first compact disk signal if the optical storage medium is a compact disk;

a second multiplexer configured to receive the second correlation signal and a second compact disk signal, transfer the second correlation signal if the optical storage medium is a digital video disk, and transfer the second compact disk signal if the optical storage medium is a compact disk; and a digital phase-locked loop configured to receive the first correlation signal and the second correlation signal if the optical storage medium is a digital video disk, receive the first compact disk signal and the second compact disk signal if the optical storage medium is a compact disk, generate the track count signal based on the first correlation signal and the second correlation signal if the optical storage medium is a digital video disk, and generate the track count signal based on the first compact disk signal and the second compact disk signal if the optical storage medium is a compact disk.

37. The servo circuitry of claim 36 further comprising a differential phase detector coupled to the first multiplexer and the second multiplexer and configured to receive a first quadrant signal, a second quadrant signal, a third quadrant signal, and a fourth quadrant signal from a detector, correlate the first quadrant signal, the second quadrant signal, the third quadrant signal, and the fourth quadrant signal to generate the first correlation signal, correlate the first quadrant signal, the second quadrant signal, the third quadrant signal, and the fourth quadrant signal to generate the second correlation signal, transfer the first correlation signal to the first multiplexer, and transfer the second correlation signal to the second multiplexer.

38. The servo circuitry of claim 36 wherein the first compact disk signal represents a radio frequency envelope signal from a radio frequency envelope detector.

39. The servo circuitry of claim 36 wherein the second compact disk signal represents a compact disk position error signal generated by a compact disk position error signal processor.

40. A method for normalizing a first signal read from an optical storage medium by an optical storage device, the method comprising:

receiving a defect signal and a seek signal in a hold circuit, generating a hold signal based on the defect signal and the seek signal, and transferring the hold signal;

receiving the first signal and the hold signal in an offset loop circuit, centering the first signal about a reference point responsive to the hold signal to generate a first centered signal, and transferring the first centered signal; and receiving the first centered signal and the hold signal in a gain control circuit, adjusting the amplitude of the first centered signal to a reference amplitude responsive to the hold signal to generate a first normalized signal, and transferring the first normalized signal.

41. The method of claim 40 further comprising inverting the seek signal to generate an inverted seek signal and ORing the inverted seek signal and the defect signal to generate the hold signal.

42. The method of claim 40 wherein the defect signal indicates when a defect is detected in reading the first signal from the optical storage medium.

43. The method of claim 40 wherein the seek signal indicates when the optical storage device is performing a seek function on the optical storage medium.

44. The method of claim 40 wherein the first signal represents a correlation signal generated by a differential phase detector.

45. The method of claim 40 wherein the first signal represents a radio frequency envelope signal generated by a radio frequency envelope detector.

46. Servo circuitry for normalizing a first signal read from an optical storage medium by an optical storage device, the servo circuitry comprising:

a hold circuit configured To receive a defect signal and a seek signal, generate a hold signal based on the defect signal and the seek signal, and transfer the hold signal;

an offset loop circuit coupled to the hold circuit and configured to receive the first signal and the hold signal, center the first signal about a reference point responsive to the hold signal to generate a first centered signal, and transfer the first centered signal; and a gain control circuit coupled to the offset loop circuit and the hold circuit and configured to receive the first centered signal and the hold signal, adjust the amplitude of the first centered signal to a reference amplitude responsive to the hold signal to generate a first normalized signal, and transfer the first normalized signal.

47. The servo circuitry of claim 46 wherein the hold circuit comprises:

an inverter circuit configured to receive the seek signal, invert the seek signal to generate an inverted seek signal, and transfer the inverted seek signal; and an OR circuit coupled to the inverter circuit and configured to receive the inverted seek signal and the defect signal, OR the inverted seek signal and the defect signal to generate the hold signal, and transfer the hold signal to the offset loop circuit and the gain control circuit.

48. The servo circuitry of claim 46 wherein the defect signal indicates when a defect is detected in reading the first signal from the optical storage medium.

49. The servo circuitry of claim 46 wherein the seek signal indicates when the optical storage device is performing a seek function on the optical storage medium.

50. The servo circuitry of claim 46 wherein the first signal represents a correlation signal generated by a differential phase detector.

51. The servo circuitry of claim 46 wherein the first signal represents a radio frequency envelope signal generated by a radio frequency envelope detector.

* * * * *

UNITED STATES PATENT AND TRADEMARK OFFICE
CERTIFICATE OF CORRECTION

PATENT NO. : 6,741,532 B1
DATED : May 23, 2004
INVENTOR(S) : James Mark Graba et al.

It is certified that error appears in the above-identified patent and that said Letters Patent is hereby corrected as shown below:

Column 5,
Line 29, replace "CD" with -- CD. --

Column 7,
Line 20, replace "Instant" with -- Instantaneous --
Line 28, replace "RP" with -- RP1 --

Column 11,
Line 19, replace "diagonals signal" with -- diagonal signals --

Column 13,
Line 20, replace "833" with -- 832 --

Column 15,
Line 32, replace "tie" with -- the --

Column 20,
Line 7, replace "To" with -- to --

Signed and Sealed this

Tenth Day of August, 2004

JON W. DUDAS
*Acting Director of the United States Patent and Trademark Office*